(12) United States Patent
Kirollos et al.

(10) Patent No.: US 7,290,445 B2
(45) Date of Patent: Nov. 6, 2007

(54) SMOKE GENERATING DEVICE

(76) Inventors: Kirollos S. Kirollos, 1701 Butterchurn Ct., Virginia Beach, VA (US) 23456; Gueorgui Milev Mihaylov, 1745 Lake Christopher Dr., Virginia Beach, VA (US) 23464

( * ) Notice: Subject to any disclaimer, the term of this patent is extended or adjusted under 35 U.S.C. 154(b) by 0 days.

(21) Appl. No.: 11/454,424

(22) Filed: Jun. 19, 2006

(65) Prior Publication Data

US 2006/0236759 A1    Oct. 26, 2006

Related U.S. Application Data

(63) Continuation of application No. 10/926,517, filed on Aug. 25, 2004, now abandoned.

(51) Int. Cl.
*A63B 53/00* (2006.01)
(52) U.S. Cl. .................................. 73/170.04
(58) Field of Classification Search .............. 73/170.04
See application file for complete search history.

(56) References Cited

U.S. PATENT DOCUMENTS

| | | | | |
|---|---|---|---|---|
| 3,658,719 A | * | 4/1972 | McConnaughey | 73/170.04 |
| 5,023,055 A | * | 6/1991 | Heckmann | 422/83 |
| 5,186,118 A | * | 2/1993 | Stinson | 116/214 |
| 5,948,366 A | * | 9/1999 | Ruther | 422/102 |
| 6,099,510 A | * | 8/2000 | Ruther et al. | 604/181 |
| 6,550,418 B2 | * | 4/2003 | Williamson | 116/264 |
| 6,848,302 B1 | * | 2/2005 | Williamson | 73/170.04 |
| 2005/0034517 A1 | * | 2/2005 | Williamson | 73/170.04 |

* cited by examiner

*Primary Examiner*—Andre J. Allen
(74) *Attorney, Agent, or Firm*—Goldizen & Associates; Bradley D. Goldizen

(57) ABSTRACT

A cold smoke generating device includes an air source that may include a hollow flexible collapsible container having an expandable and compressible cavity for accepting air and air-borne reagent therein. The collapsible container is fluidly connected with a narrow flexible extension that includes an elongated cavity or chamber. Isolated and/or free reagents are disposed within the chamber of the narrow flexible extension. These reagents are capable of reacting with each other, with atmospheric air, or with other gases and fluids to generate a visible aerosol when expelled into the surrounding air.

20 Claims, 18 Drawing Sheets

SMOKE GENERATING DEVICE

The present application is a continuation application of U.S. patent Ser. No. 10/926,517 filed on Aug. 25, 2004 now abandoned.

The present invention did not receive any federal research and development funding.

FIELD OF THE INVENTION

The invention generally relates to a cold smoke generating device and more particularly to a device which comprises a hollow flexible collapsible container having an expandable and compressible cavity for accepting air and air-borne reagent therein. The collapsible container is fluidly connected with a narrow flexible extension that comprises an elongated cavity or chamber. Isolated and/or free reagents are disposed within said chamber of the narrow flexible extension. These reagents are capable of reacting with each other, with atmospheric air, or with other gases and fluids to generate a visible aerosol. This aerosol may be easily dispersed or expelled from the chamber by exerting a force or pressure onto an exterior of an expanded container causing air located therein to be forced from the container, into an end of the chamber, across the reagents to be expelled through an open end of the chamber. The process is begun by exposing a reduced pressure interior of the chamber to an atmospheric pressure by removing an end of the chamber. This creates an enriched blending of air with reagent to promote an air quality having a greater percentage of reagent to produce stronger more visible vapor or smoke streams.

BACKGROUND OF THE INVENTION

Portable, compact smoke generators are widely used for marking a direction and velocity of current air currents or gas flow. They are used to generate a continuous stream of fumes when used with an air supply pump or to produce a small cloud of smoke when used with stroke-type hand pumps.

Conventional smoke generators, commonly called ventilation smoke tubes, operate by passing air over a bed of granular sorbent material impregnated with a substance that reacts with the moisture in the air resulting in dense smoke. One such use of these generators is testing the fitting of respiratory protection equipment, in accordance with OSHA Respiratory Protection Standard 29 CFR 1910.134.

A major drawback of the known art is the use or presence of highly reactive substances that are harmful and must be carefully handled to prevent personal injury or property damage. Typically, the substances are impregnated in carrier materials and sealed glass tubes that include breakable tips. The carrier material is retained in place by mesh-cups and plugs. The process of manufacturing known smoke generators involves many difficult technological steps which result in more costly generators.

Another problem associated with the current smoke generators is the slow reaction between the active reagent and surrounding materials which limits the shelf life of the tubes. Use of glass in the prior art devices presents a hazard to both the user and the generator itself. Edges of broken glass are hazardous when the tube is used in close proximity with humans (such as in the air tight fitting tests for respirators). The use of such glass tubes requires frequent changes of a rubber bulb used widely as a pump because glass particles tend to destroy or limit the life of the pump. The whole construction is bulky and is unsafe.

McConnaughey, U.S. Pat. No. 3,658,719, teaches a smoke generating tube constructed with two reagents that are contained within separate glass ampoules. Each ampoule is enclosed within a perforated envelope of polyethylene tubing. The ampoules have to be broken together to produce smoke. The perforations within each envelope are small in dimension so that transfer of the volatile acid is substantially by diffusion. That is, there is no significant convection flow of gases through the envelope. The above mentioned problems and drawbacks apply to this device. Moreover, it is very difficult to break the glass containers to activate the tube.

SUMMARY OF THE INVENTION

The present invention is a cold smoke generating device that comprises a collapsible container having a cavity for accepting air therein. The collapsible container is fluidly connected with a flexible extension having a chamber that contains one or more ampoules comprised of breakable or crushable material. One or more reagents are included in the ampoule(s) for chemically reacting to produce a visible vapor or smoke.

The chamber may be provided at a reduced pressure and include a removable tip that hermetically seals the chamber. During use, the ampoule is broken to release the reagents. The tip is then removed causing atmospheric pressure to force air into the collapsible container by passing it across the reagent. The collapsible container fills with enriched vaporous air and may be collapsed to cause the enriched vapors to pass through the chamber and across the reagent to be expelled from the removed tip into the surrounding air to generate a vapor or aerosol.

It is an object of the present invention to provide a smoke generating tube which is simple to manufacture, safe to use and has a long shelf life.

Another objective of the invention is to apply contemporary materials and use their features to provide a completely sealed ready-to-use self-contained smoke generator that alleviates the need for a separate pump unit and mountable glass tube construction. The present invention incorporates the features of a pump and smoke generator into one unit which is easy hermetically assembled together.

According to the present invention, a collapsible hollow plastic container is connected fluidly with an elongated flexible hollow plastic extension. The flexible hollow plastic extension preferably includes a generally round cross-section shape that may include a cylindrical, conical, ogival or any such combinational shape. One or more ampoules comprising crushable material such as crystalline polystyrene, acrylic, glass, or the like are disposed within an interior cavity of the flexible hollow extension.

Each ampoule is filled with reagent or a plurality of reagents that react to produce a vapor or smoke. Each ampoule has at least one weakened region in the sidewall thereof to aid in breakage of the ampoule and release of a stored substance, such as a reagent. Typically the ampoule includes a region across the longitudinal axis which is mechanically less sound or rigid than the other areas of the ampoule structure. This region may be of smaller diameter than other regions of the sidewall comprising the ampoule, a mechanical scratch, notch or the like. The purpose of this mechanically weakened place is to allow easy breakage of the ampoule when the surrounded container is bent or twisted. The ampoules are immobilized and held in place within the interior of the flexible hollow plastic extension by means of at least one chemically-resistant plug. The plug may comprise felt, such as polypropylene or polyester felt, semi or fully sintered low or high porous plastic materials that exhibit low aerodynamic resistance characteristics.

In one embodiment, the collapsible container is fully collapsed and hermetically sealed to one end of the elongated extension when stored. The other end of the elongated extension that retains the ampoules is sealed with a removable end. The system is under moderate vacuum and has minimum volume. That is to say, the interior of the collapsible container and the elongated extension is exposed to a vacuum. By simply bending the flexible container, the inserted ampoule or plurality of ampoules breaks and the contents spread into the plug material. To activate the smoke generator, the interiors of the collapsible container and extension are exposed to atmospheric air by opening the sealed end of the flexible extension. Typically this is achieved by removing the sealed end seal by cutting or tearing off the end. Atmospheric air fills the container and extension to fully expand the sidewalls of the collapsible container to its nominal volume. The container then may be partially or fully collapsed to expel reagent laden air from within the smoke generating tube.

When the collapsible container is squeezed, the air passes through the plugs, evaporates part of the reagent and mixes it within the chamber directly before the air is expelled from the removed end. Depending upon the type of reagents used, the vapors react together and/or with the air (preferably with normally present water content in the air) to generate an aerosol visible as smoke. Single compound reagents such as titanium tetrachloride and/or tin tetrachloride can be used to fill a single ampoule. Both of these reagents evaporate at over 100° C. (212° F.) and can be stored safely in ampoules. Their vapors when coming into contact with air, immediately forms aerosols exhibiting good visibility qualities. Less irritating fumes can be generated. by using two or more ampoules filed with acid and base reagents. As one skilled in the art will notice, the collapsible container serves as a portable source of air flow. Other sources, such as a hand pump, electric pump, blower or pressurized cylinder air supply, can be used provided the average air flow is within the same air flow range as with the original collapsible container.

The air stream mixes the vapors by the mechanism of molecular diffusion and turbulence caused by the internal structure of the tube. The result is emitting an agent that reacts with humidity content in air to form a very visible aerosol.

BRIEF DESCRIPTION OF THE DRAWINGS

The present invention is illustrated on the accompanying drawings where

FIG. 1A depicts a view of a device of the present invention and in a stored shape. The interior of the collapsed hollow container is under reduced pressure conditions. An ampoule within the elongated extension is intact. A plug is disposed within a chamber of a flexible extension FIG. 1B represents the first phase of activation of the smoke generating device wherein the ampoule is broken to release reagents stored therein by stressing or flexing the extension. Next, the sealed end of the extension is opened.

FIG. 1C shows the expansion of the collapsible hollow container by atmospheric pressure being drawn in through an open end of the flexible extension. The air is drawn in and passes through the reagent soaking into the porous plugs.

FIG. 1D renders the collapsible hollow container and the flexible extension full of air enriched with reagent vapors.

FIG. 1E illustrates the phase of smoke generation where the enriched air passes again through the reagent impregnated plugs, to increase its concentration of the reagent before it is emitted into the surrounding air where it generates a strong cloud of aerosol.

DETAILED DESCRIPTION OF THE INVENTION

Figure 1A:
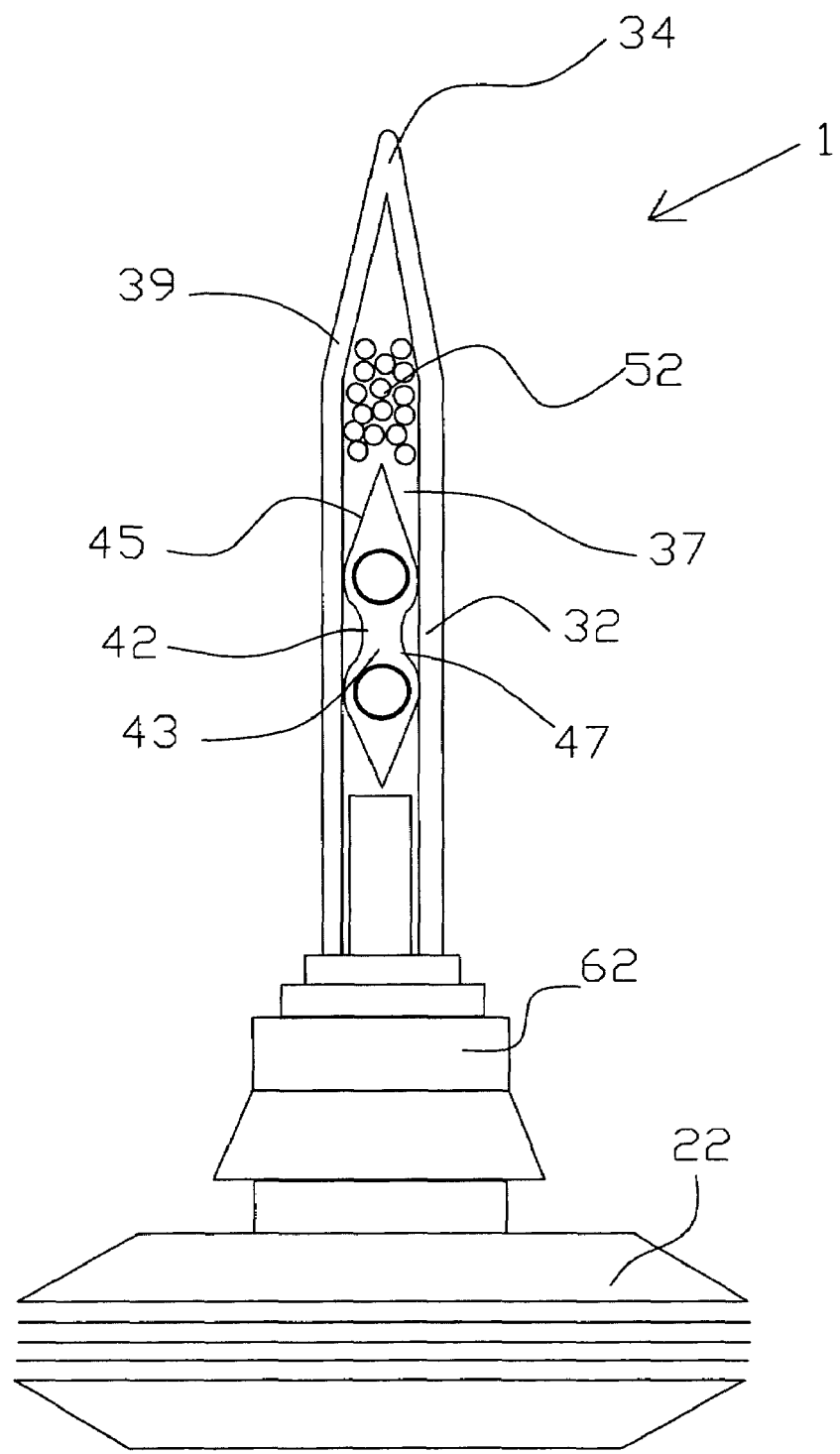
FIG. 1A through E shows the schematic of the smoke generating device in different stages of action.

For one skilled in the art, the illustrated invention is self-explanatory and the features and advantages are self-explanatory as well. As seen on the drawings FIG. 1A to E, the device 1 comprises a collapsible hollow container 22 is in fluid connection with one end of the flexible elongated extension 32 defined by a sidewall 39. The other end of the flexible extension 32 is sealed with tip 34 (or hermetical cap 38 shown on FIG. 3 and FIGS. 7-9). The flexible extension 32 includes an elongated chamber 37 for accommodating an ampoule 42. A plug 52 is disposed within chamber 37 between ampoule 42 and tip 34. A gas tight joint 62 connects the flexible extension 32 to the collapsible container 22.

In this embodiment, at least one ampoule 42 is filled with reagent. The ampoule includes a cavity 43 defined by ampoule sidewall 45. The ampoule sidewall 45 typically comprises crushable materials such as crystalline polystyrene, polymethylmetacrylate (acrylic), glass etc. In this embodiment, the ampoule 42 has along its longitudinal axis at least one place mechanically or structurally weakened area 47 that may comprise a thin sidewall region. This may be achieved by notching or scratching the sidewall 45 of the ampoule 42.

Figure 1B:
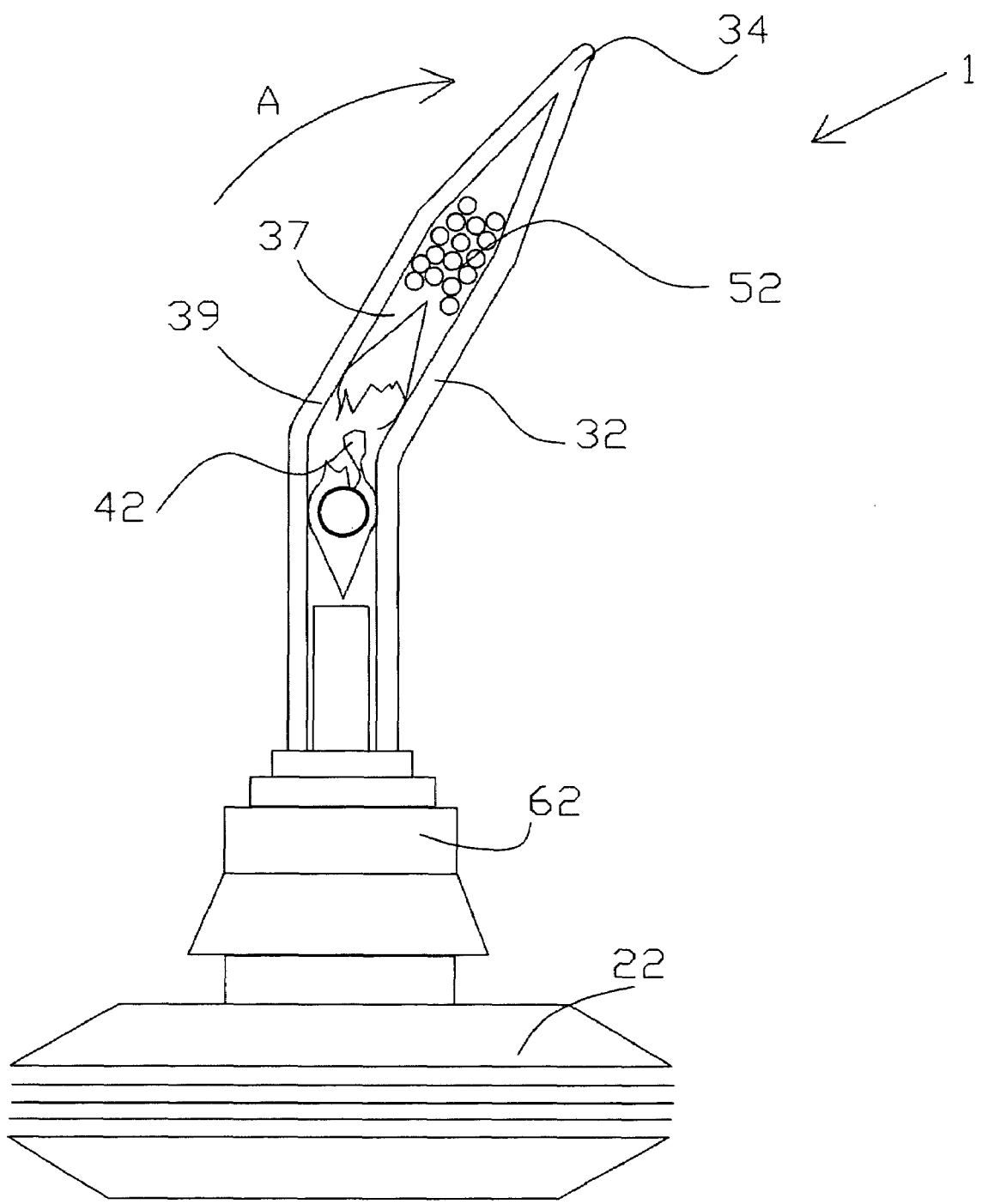
Figure 1C:
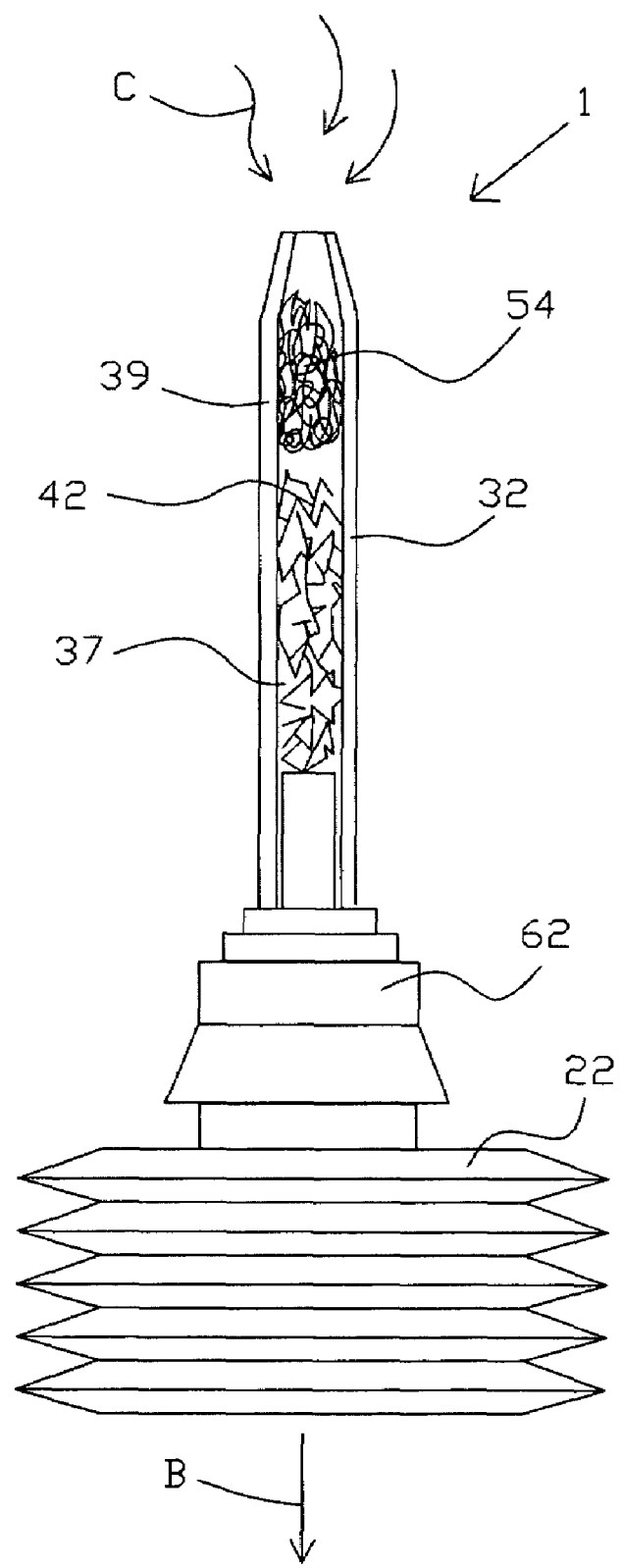
Figure 1D:
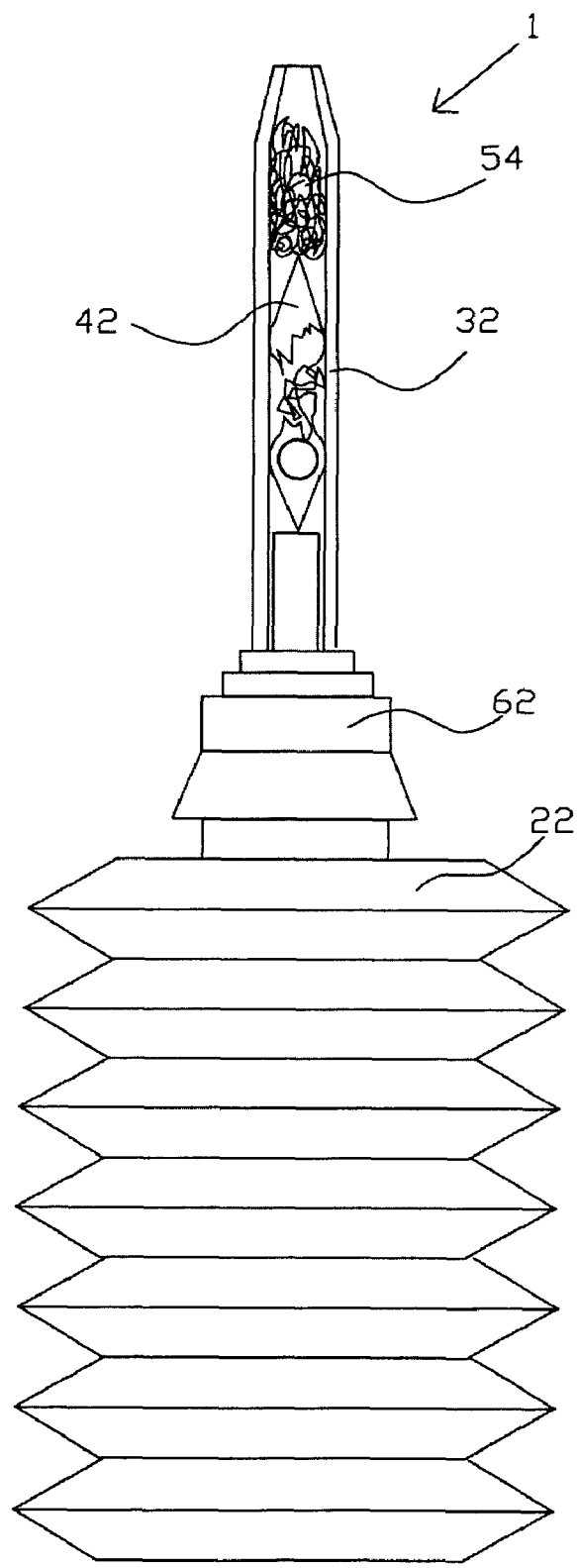
Figure 1E:
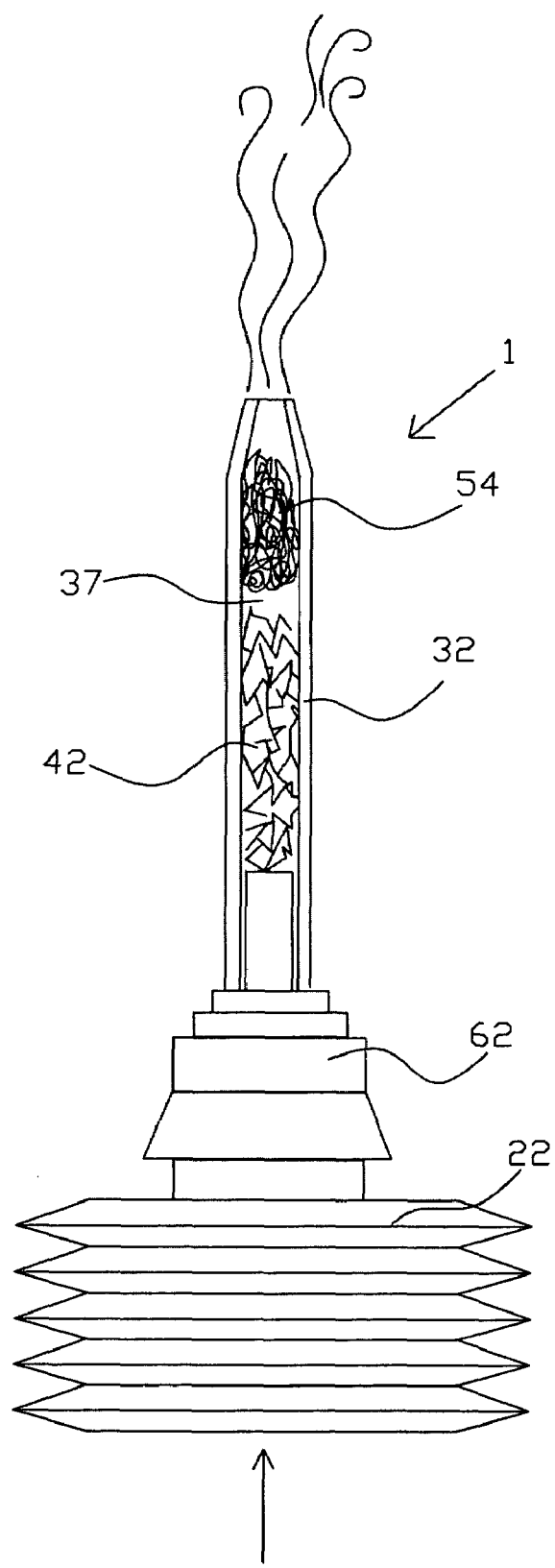
Figure 2:
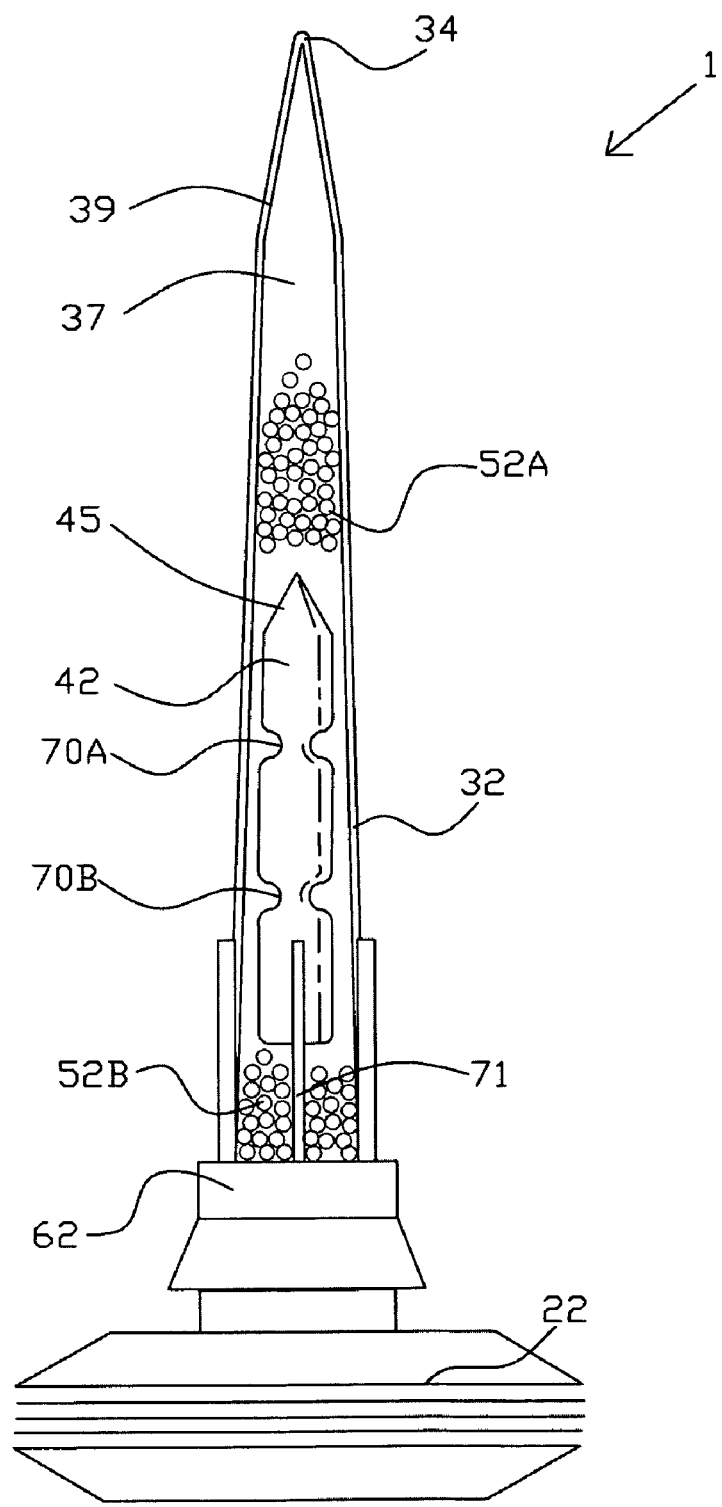
FIG. 2 shows an inactive device prior to use and containing an ampoule with two mechanically weakened points along its main or longitudinal axis. Plugs are disposed within the flexible extension at opposite ends of the ampoule. The ampoule is secured at one end for aiding in breakage of the ampoule.
Figure 3:
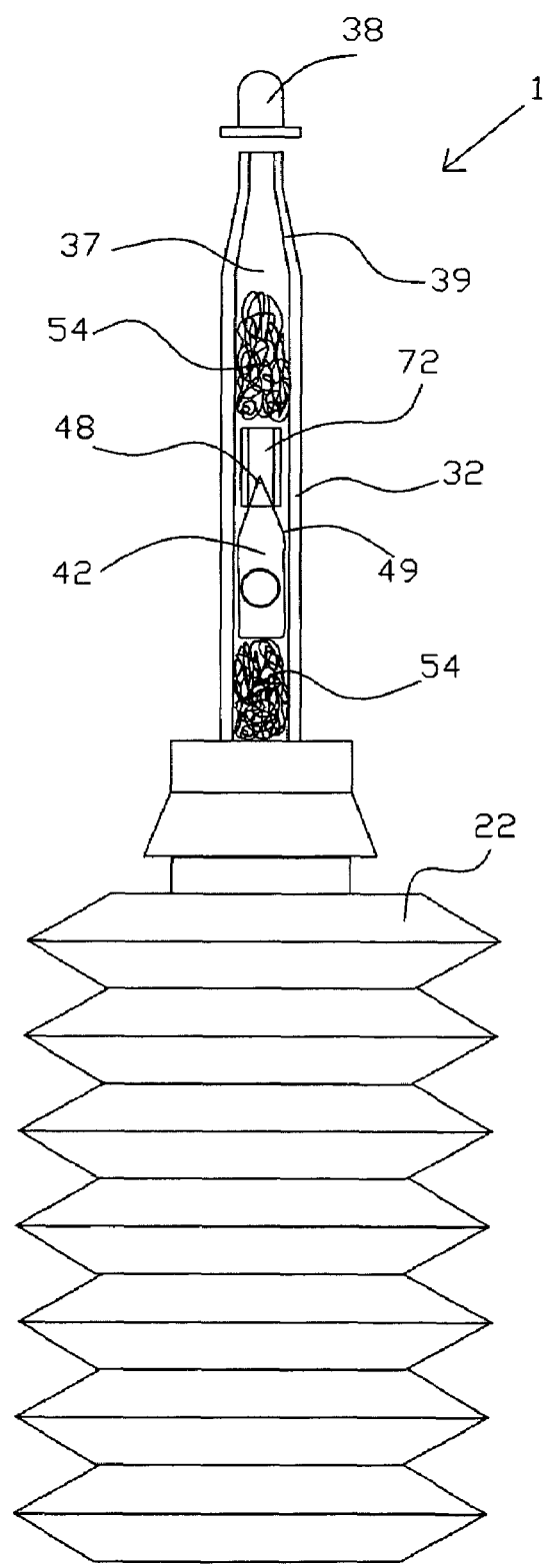
FIG. 3 represents a variant for easy ampoule breaking and comprises a short, sharp and hard tube surrounding a weakened tip of the ampoule.
Figure 4A:
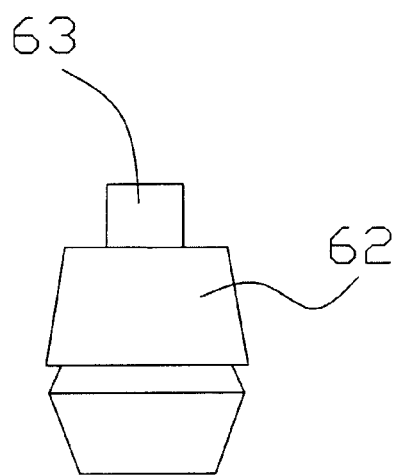
FIG. 4A depicts an elevation view for a gas tight joint between the collapsible container and flexible extension.
Figure 4B:
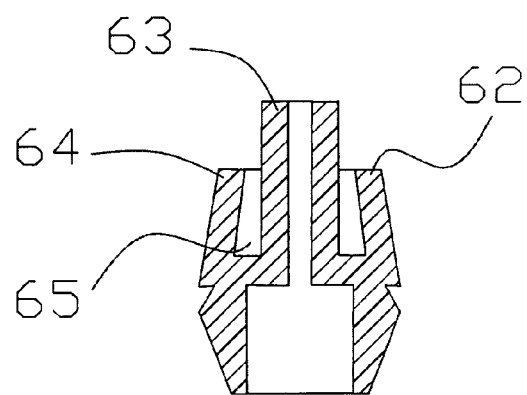
FIG. 4B is a cross section view of FIG. 4A.
Figure 4C:
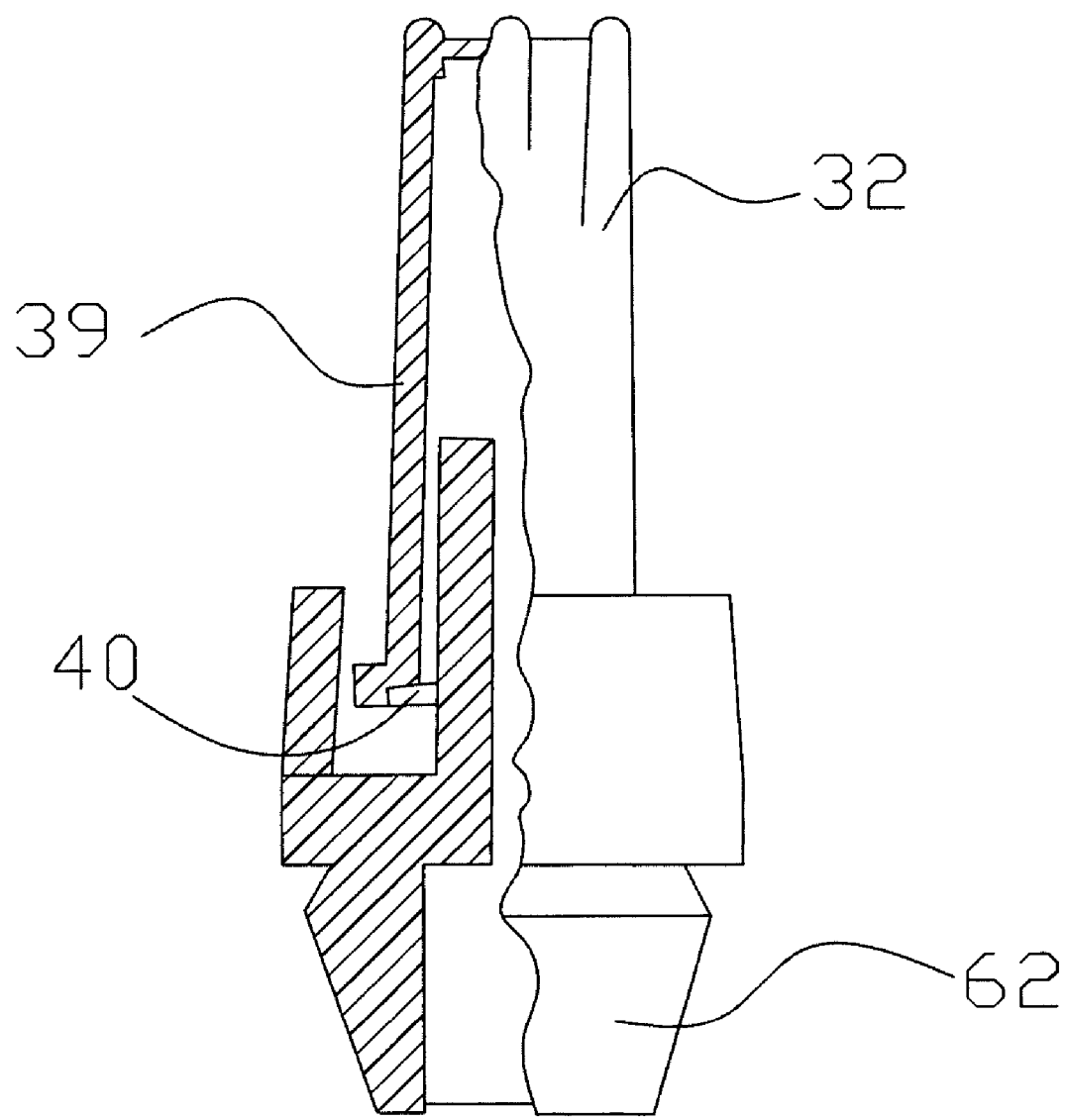
FIG. 4C shows the gas tight joint of FIG. 4A in a partial cross section view and having an end attached to the flexible extension.
Figure 5:
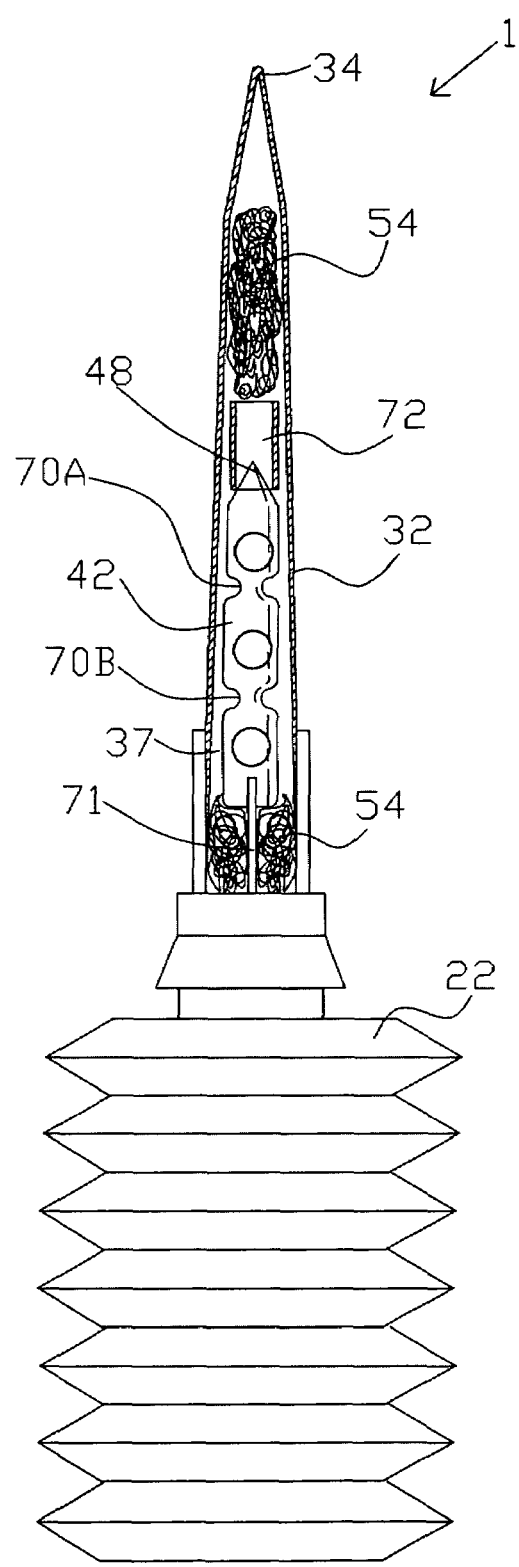
FIG. 5 is an elevation view showing the flexible extension in cross section and depicting another embodiment of the invention. This embodiment includes a tube as in FIG. 3. However, the ampoule includes notched sections for facilitating the breakage thereof. The ampoule in this embodiment may include a plurality of regions that are segregated to include multiple reagent that react with one another upon breaking of the ampoule. Felt plugs may provided at either end of the ampoule for absorbing reagent.
Figure 6A:
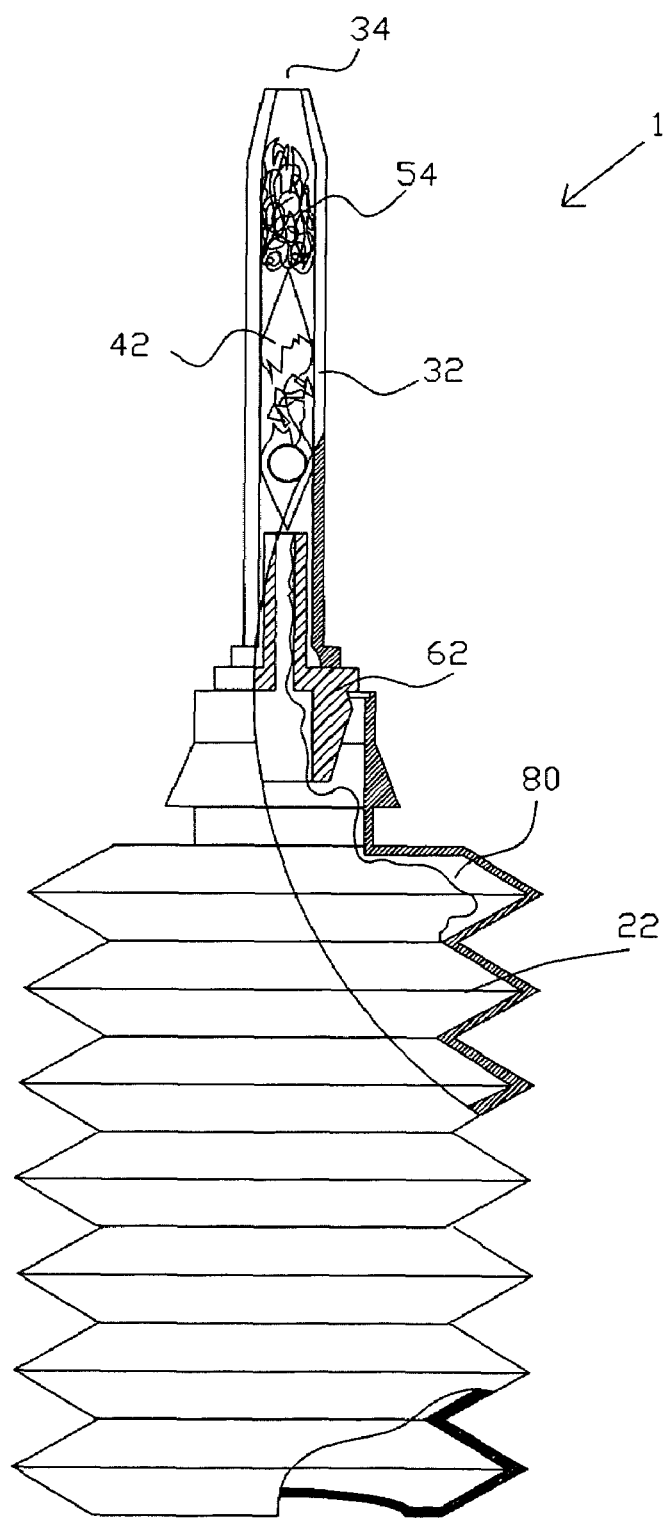
FIG. 6A is a partial cross section view of the device showing a broken ampoule and having the content of ampoule soaked onto the walls of the collapsible container cavity.
Figure 6B:
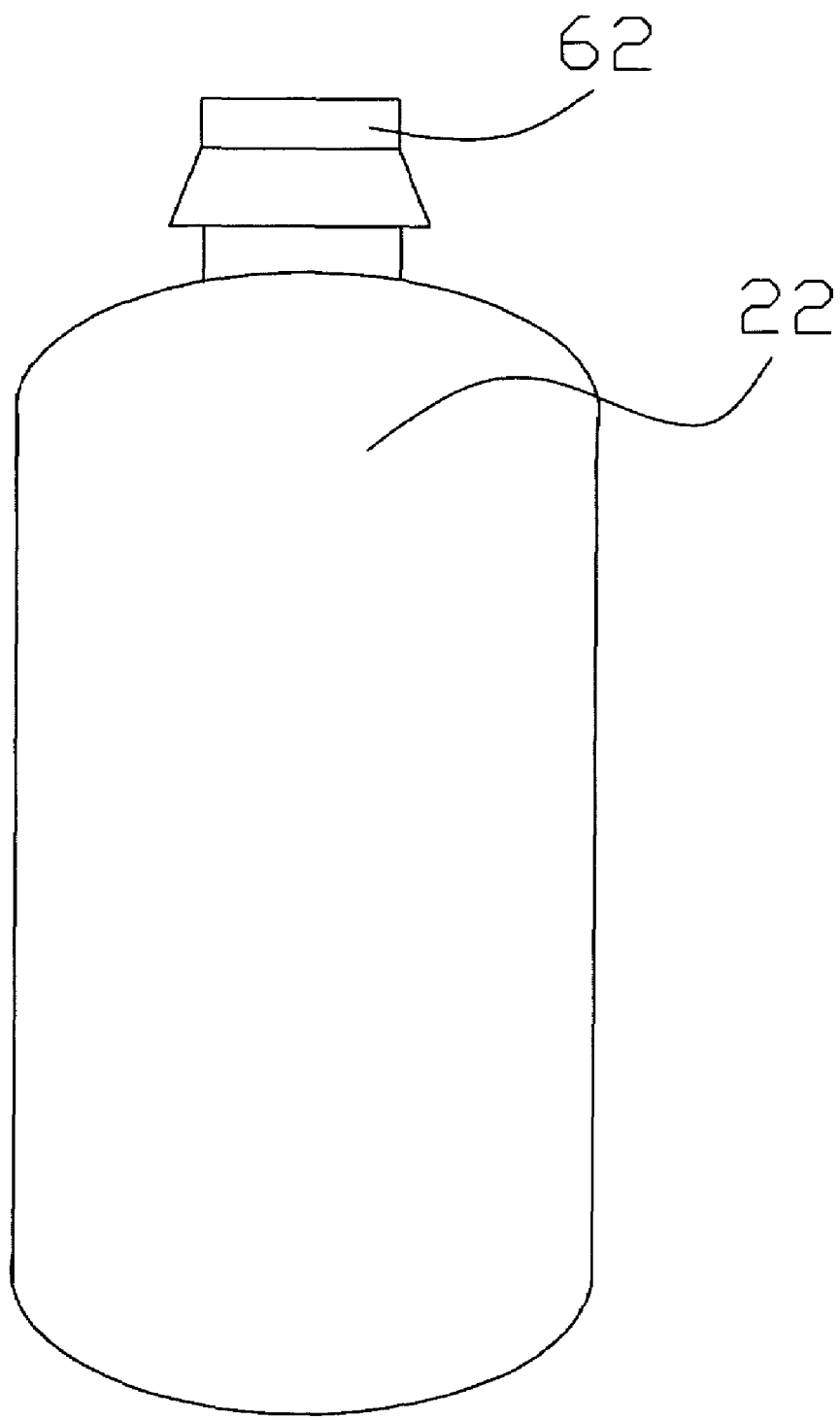
FIG. 6B is a bulb-type collapsible container and showing a gas tight joint for joining the container to a flexible extension.
Figure 6C:
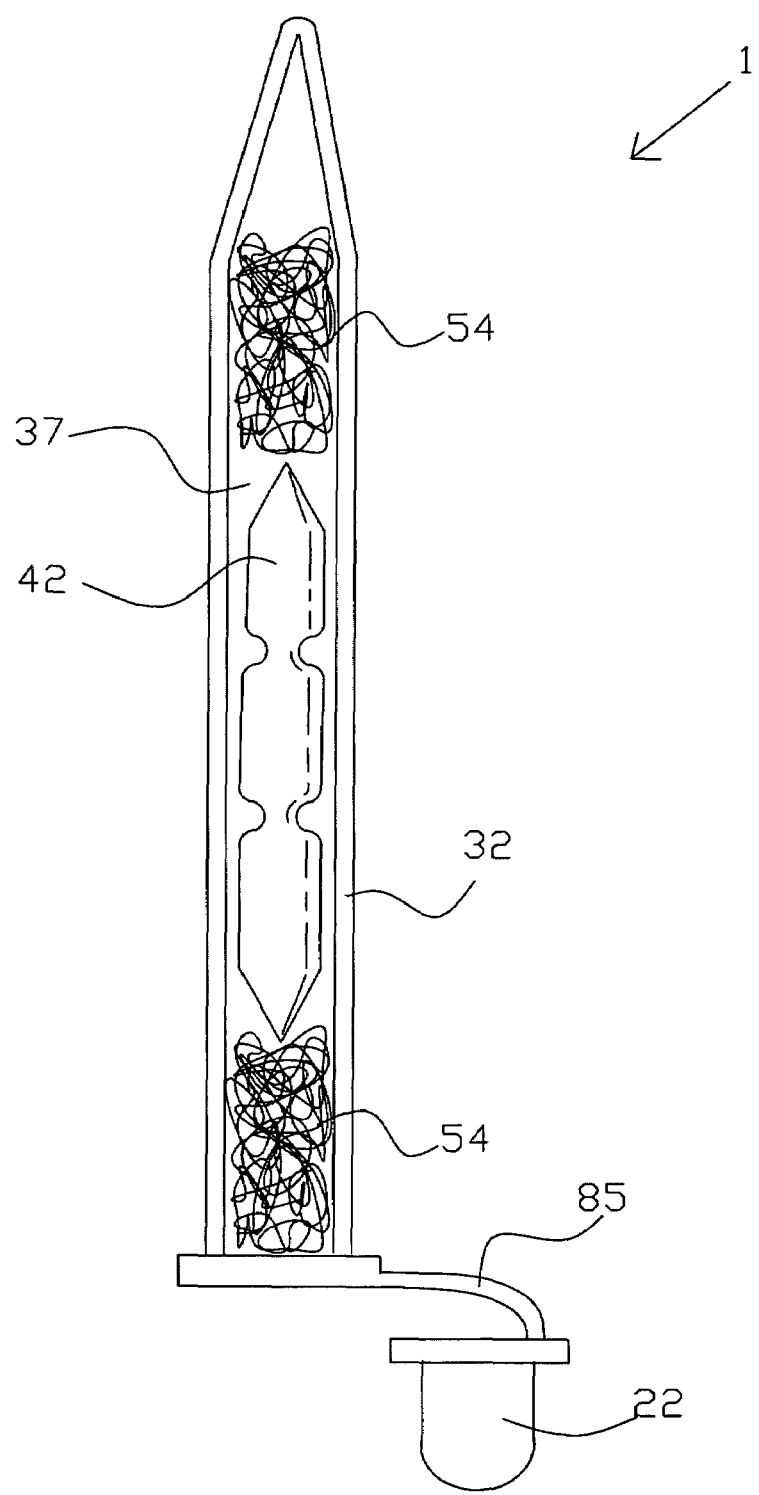
FIG. 6C shows a different embodiment of the invention wherein an end of the flexible extension includes a cap connected to a conduit that connects the flexible extension to a depressible bulb-type collapsible container
Figure 7:
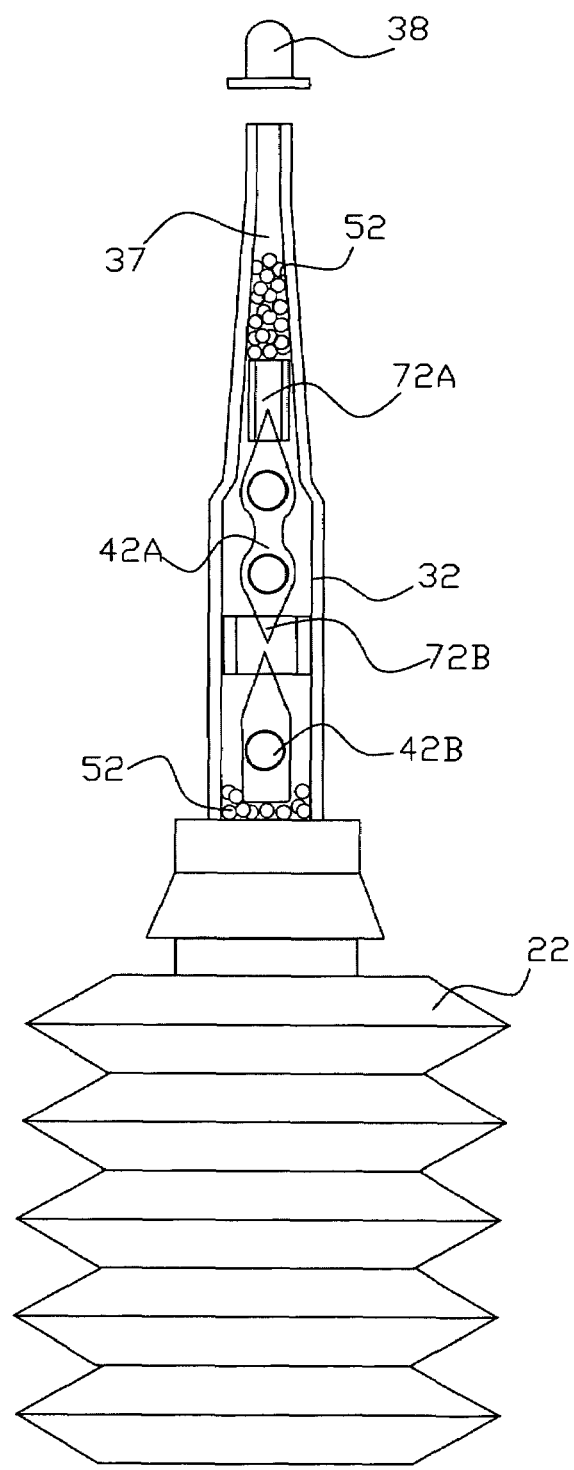
FIG. 7 shows a plurality of ampoules disposed within the flexible extension. A removable end cap is included at an end of the flexible extension.
Figure 8:
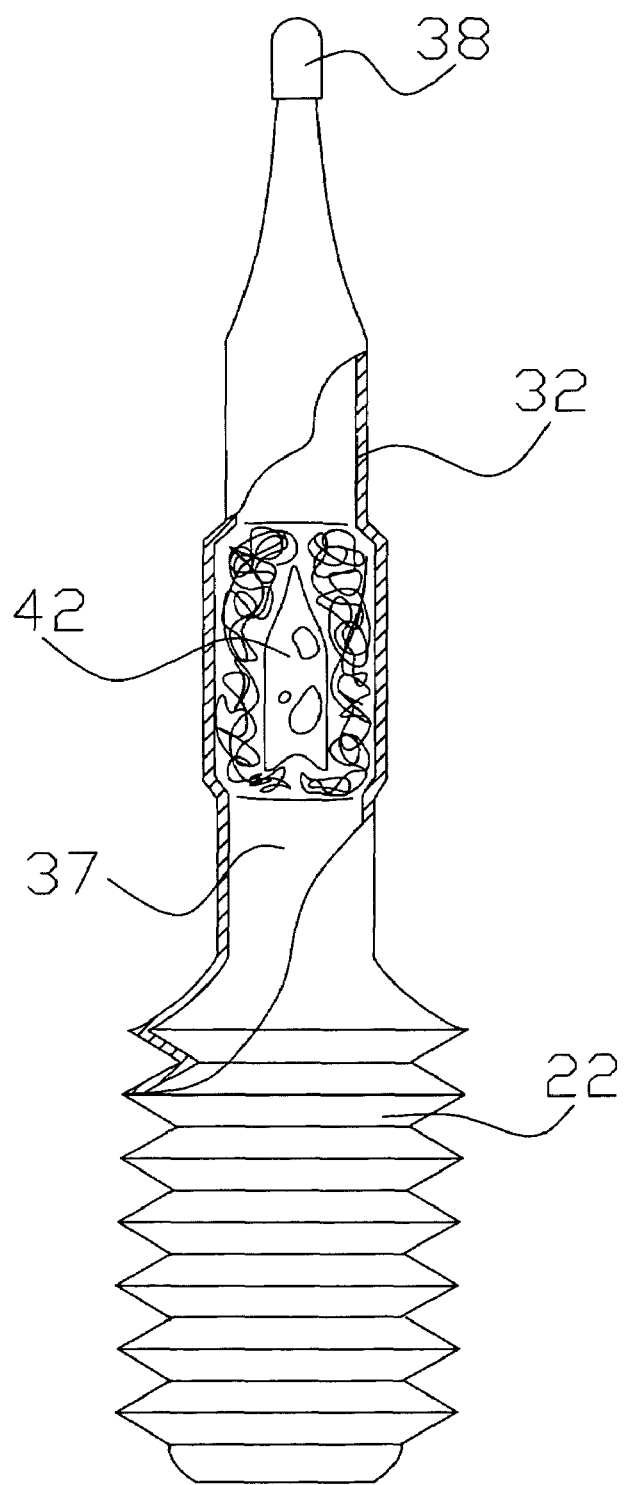
FIG. 8 is a partial cross section view of another embodiment of the invention. The flexible extension includes a removable end cap. Plugs are longitudinally disposed along an exterior of the ampoule.
Figure 9:
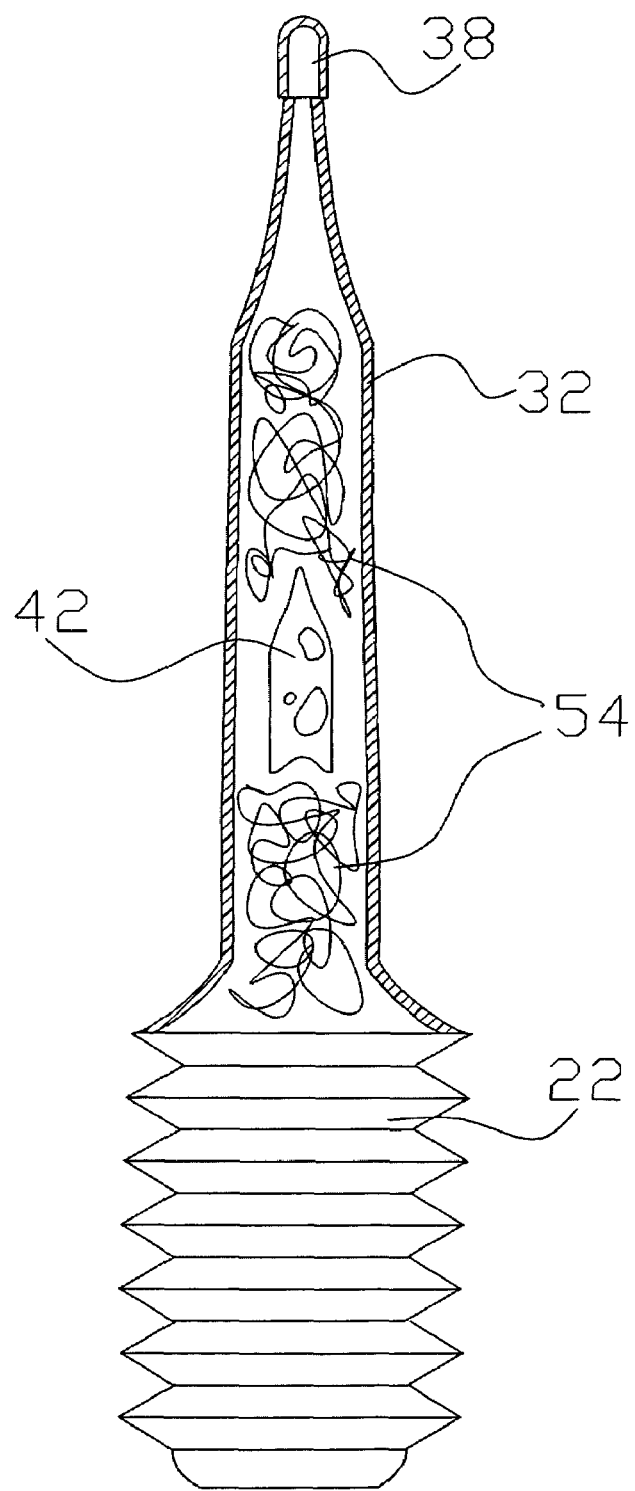
FIG. 9 is a partial cross section view of another embodiment of the invention showing the flexible extension with a removable end cap. Plugs are disposed within the chamber of the extension at opposite ends of the ampoule.
Figure 10A:
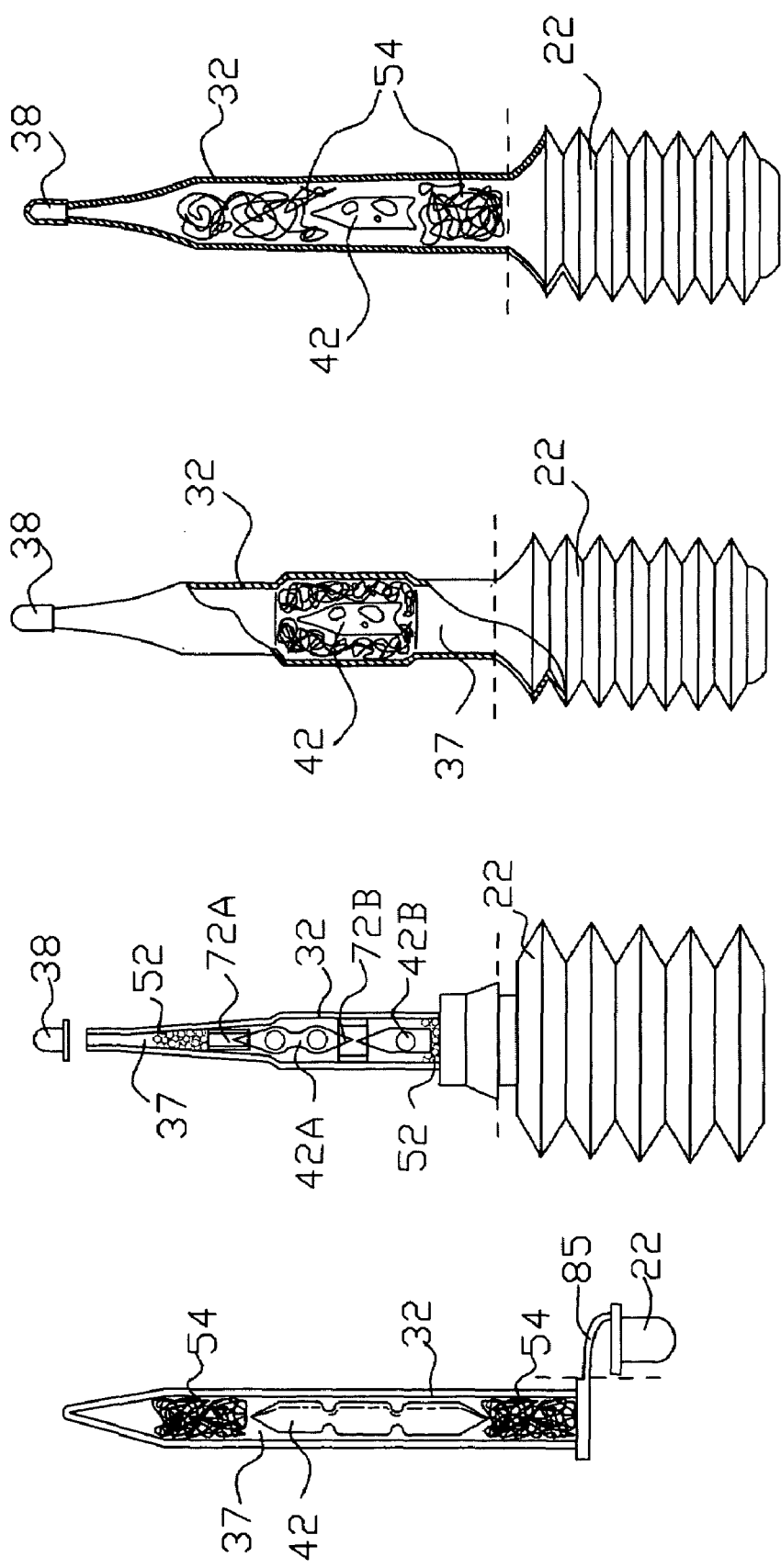
FIG. 10A shows smoke generating devices with marked line of separation between the collapsible and elongated flexible containers.
Figure 10B:
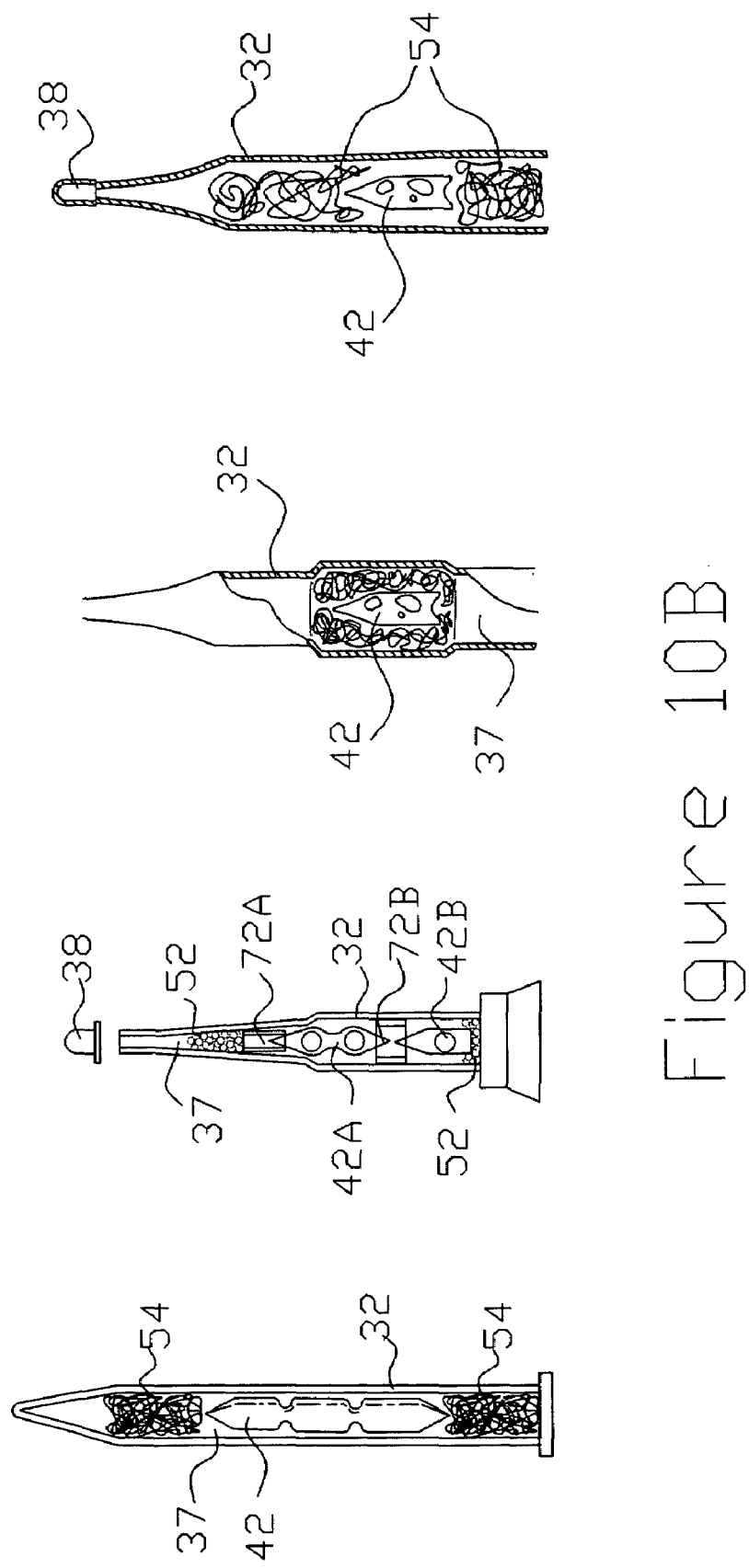
FIG. 10B shows a variety of flexible elongated extensions separated from the collapsible container and used with an alternative source of air flow.

In FIG. 1A, the collapsible container 22 is shown fully collapsed to develop a partial vacuum confined, within the interior of the collapsible container 22 and chamber 37. In FIG. 1B, the device 1 is activated after crushing or breaking ampoule 42 to release its contents by flexing or bending the sidewall 39 of the flexible elongated container 32 in a direction of Arrow A. Next, the tip 34 is cut or removed from extension 32. Air from the surrounding atmosphere passes through the released reagent that spills from the broken ampoule 42. The reagent typically soaks into the plugs 52 that may comprise a porous felt or sintered porous material.

FIG. 1C shows the device 1 the moments following the removal of tip 34. Atmospheric air, depicted by arrows C, is sucked through the chamber 37 and into the collapsible container 22 to expand the container 22 in the direction of arrow B. This air is enriched to some level with vapors from the broken ampoule 42 with reagent and the sintered plug 54. In FIG. 1D, the flexible extension 32 fills with air enriched to some level with vapors of the reagent. This position illustrates the device ready to release the generated smoke.

FIG. 1E illustrates the phase of smoke generation where the air passes the plugs for a second time to absorb more vapors from the reagent to increase the content of the reagent vapors within the air. The enriched air is released to the environment where it reacts with the moisture normally present in the air even if the absolute humidity is low. As a result of this immediate reaction, a smoke from fine aerosol particles is generated. More than one ampoule 42 may be included within the chamber 37. Each ampoule 42 has at least one mechanically weakened point such as a smaller diameter, a thinner wall, a notch or a surface pre-scored scratch.

In FIG. 2, the device 1 is shown inactivated and having an ampoule with two weakening diameters along the main axis. In this embodiment, notches 70A and 70B, include a region of the ampoule sidewall 45 that has a smaller diameter and an area that is less resistive to compressive, tension or other shear forces. In this embodiment, sintered plugs 52A and 52B are provided within chamber 37 near opposite ends of ampoule 42. A holder 71 secures ampoule 42 so that it may be easily broken by flexing the sidewalls 39 that define chamber 37.

FIG. 3 depicts an alternative method for easily breaking the ampoule 42. In this embodiment, the ampoule 42 includes a tip 48 and a shoulder 49. The tip 48 is disposed within a cylindrical tube 72 as shown. The cylindrical tube 72 is arranged within the chamber 37 along with the ampoule 42. The cylindrical tube 72 includes a sharp cut diameter and is comprised of a hard material (preferably glass) for receiving a weakened edge or tip of the ampoule. When the sidewalls 39 are flexed, the hard tube 72 easily breaks the tip 48 of the ampoule 42 and facilitates further crushing. This embodiment includes a removable cap.

Turning now to FIG. 4A through 4C, the connection between the collapsible hollow container 22 and the flexible extension 32 must be hermetic. To facilitate this connection and to support the content of the tension from moving into collapsible container 22, a specially designed click-lock connector 62 has two joining surfaces allowing hermetically tight connection. The connector 62 comprises an internal extension 63 that extends into chamber 37. An external extension 64 defines a seat 65 for accommodating an end of extension 32. A lip 40 may be included on an exterior of the sidewall 39 for locking the extension 32 onto the collapsible container 22.

In FIG. 5, another embodiment for easily breaking the ampoule 42 includes a combination of previously mentioned embodiments. In this embodiment, the ampoule 42 includes two weakened regions or notches 70A and 70B. One end of the ampoule 42 comprises a tip 48 that extends into a hardened cylindrical tube 72. An opposite end of the ampoule 42 is secured within chamber 37 by holder 71. The ampoule is easily broken by flexing extension 32.

The device shown in FIG. 6A, does not include a plug disposed between the ampoule 42 and connector 62. This allows the content 80 to flow onto the interior of the walls of the collapsible container 22 decreasing the aerodynamic resistance of the assembly. This variant is convenient one if pre-assembled containers are intended as initial device. In FIG. 6B, a bulb type collapsible container 22 is shown. In use, the container 22 is squeezed by the operator to expel air from within the container 22. A connector 62 is connected at an end of the container 22 for mating with an end of a flexible extension. In FIG. 6C, plugs 54 are disposed within chamber 37 at opposite ends of the ampoule. An end of the flexible extension is sealed by a cap 38 that connects to a collapsible container 22 via conduit 85.

The example illustrated in FIG. 7 shows the use of more than one ampoule 42A and 42B, similar to FIG. 5 into the elongated container. This is the case when two or more reagents have to a produce substance capable of reacting with the air once they exit the chamber 37. In this embodiment, a removable end cap 38 hermetically seals an end of chamber 37 until removed. Plugs 52 are disposed at opposite ends of the chamber 37. A first hollow tube 72A receives a tip of ampoule 42. A second hollow tube 72B receives a second tip of ampoule 42A at one end and a tip of ampoule 42B at an opposite end thereof.

In FIG. 8, plugs 54 are disposed longitudinally along an exterior of ampoule 42 within chamber 37. Flexible extension 32 may include a flared region as shown for accommodating the plugs 54 and ampoule 42. In FIG. 9, plugs 54 are disposed at opposite ends of ampoule 42, as shown.

The variety of flexible elongated extensions separated from the collapsible container can easily be used with any alternative source of air flow as can be recognized in FIGS. 10A and 10B. Such sources can be: a hand pump, electric pump, electric blower, gas pressurized canister or the like, provided the air flow through the elongated extension with broken ampoule is moderately similar to the one received with the collapsible container.

We claim:

1. A smoke generating device for generating smoke to be discharged into air near the device comprising:
   a flexible collapsible hollow container fluidly connected to a flexible elongated extension and including a compressible cavity that is made from a material having a memory of an original shape that may be mechanically deformed and thereafter assumes the original shape and said flexible extension having two ends and a sidewall that defines a chamber, one end of said flexible extension being in fluid connection with said collapsible hollow container, a second end of said flexible extension being sealed;
   at least one ampoule coaxially arranged inside said flexible extension chamber comprising a wall of an inert rigid breakable material filled with a liquid reagent capable of generating aerosol when exposed to air; and,
   a porous flexible material filling a space between the wall of said at least one ampoule and the sidewall that defines a chamber of said flexible extension and exerting friction against said flexible extension chamber to secure said ampoule in place;
   wherein said smoke generating device operates by bending said flexible extension to crush the at least one ampoule to cause a soaking of said porous flexible material by said reagent, said second end of said flexible extension is removed to allow atmospheric pressure external to the flexible collapsible hollow container to draw air into an opening created by the removal of said second end such that the air passes over said liquid reagent to be enriched with said liquid reagent and expand said collapsible hollow container and the compressible cavity is compressed to expel the air therefrom.

2. The smoke generating device of claim 1 further comprising at least one porous plug for absorbing a reagent.

3. The smoke generating device of claim 1 wherein said ampoule being breakable upon bending or twisting said flexible extension and said ampoule being fixed in place by at least one porous plug such that said plugs are soaked when said ampoule is broken to enrich air which passes through said plug.

4. The smoke generating device of claim 1 further including a gas tight connector disposed between the collapsible container and the flexible extension.

5. The smoke generating device of claim 1 wherein said ampoule has longitudinally situated weakened regions that aid in breaking the ampoule.

6. The smoke generating device of claim 1 wherein said ampoule is a cylinder having a diameter and said ampoule has one or more regions where the diameter is decreased to aid in breaking the ampoule.

7. The smoke generating device of claim in 1 wherein the ampoule includes surface scratches for aiding in breaking the ampoule.

8. The smoke generating device of claim 1 wherein said ampoule has one conical end inserted into a hard tube disposed within said chamber to facilitate breaking of the ampoule.

9. The smoke generating device of claim 1 wherein said chamber and said collapsible container are separate pieces assembled together directly before use to allow use of one collapsible container with several consecutive flexible extensions.

10. The smoke generating device of claim 1 wherein said plug comprises felt.

11. The smoke generating device of claim 1 wherein said plug comprises a sintered material.

12. The smoke generating device of claim 1 wherein said ampoule comprises a mechanically weak region having one or more selected from a group consisting of a smaller diameter, a notch, a sidewall having a thin region, a pre-cored sidewall and a scratched surface to aid in breakage of the ampoule.

13. The smoke generating device of claim 1 further comprising a removable end cap that seals an end of the chamber.

14. The smoke generating device of claim 1 further comprising a pair of plugs disposed, in a longitudinal direction, on an exterior of said ampoule, and within the chamber.

15. The smoke generating device of claim 1 further comprising a hollow rigid material for accepting a tip of the ampoule to aid in breakage of the ampoule.

16. A smoke generating device for generating smoke to be discharged into air near the device comprising:
   an external source of air flow;
   a flexible extension having two ends and a sidewall that defines a chamber, one end of said flexible extension being in fluid connection with said external source of air flow, a second end of said flexible extension being sealed;
   at least one ampoule coaxial arranged inside the chamber of the flexible extension and comprising a wall of an inert rigid breakable material filled with liquid reagent capable of generating aerosol when exposed to air; and,
   a porous flexible material filling a space between the wall of said ampoule and the sidewall of said flexible extension chamber to exert friction upon said flexible extension chamber to secure said ampoule in place;
   wherein said smoke generating device operates by bending said flexible extension to crush the at least one ampoule to cause a soaking of said porous flexible material with said reagent, said second end of said flexible extension is removed and said external of air flow is operated to expel air through said flexible extension to the ambient atmosphere, therefore allowing said liquid reagent to interact with air and form smoke that may be discharged from the smoke generating device.

17. The smoke generating device of claim 16 wherein said source of air flow is an electric driven pump or blower.

18. The smoke generating device of claim 16 wherein said source of air flow is a hand operated pump.

19. The smoke generating device of claim 16 wherein said source of air flow is a pressurized gas container.

20. The smoke generating device of claim 16 wherein said source of air flow is a collapsible hollow container including a compressible cavity having an interior pressure that is less than an atmospheric pressure external to said compressible cavity.

* * * * *